United States Patent
Wang et al.

(10) Patent No.: US 11,780,447 B2
(45) Date of Patent: Oct. 10, 2023

(54) TORQUE VECTOR DISTRIBUTION SYSTEM FOR HUB MOTOR DRIVING SYSTEM

(71) Applicant: Schaeffler Technologies AG & Co. KG, Herzogenaurach (DE)

(72) Inventors: Jin Wang, Shanghai (CN); Hui Su, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 205 days.

(21) Appl. No.: 17/438,581

(22) PCT Filed: Mar. 19, 2019

(86) PCT No.: PCT/CN2019/078628
§ 371 (c)(1),
(2) Date: Sep. 13, 2021

(87) PCT Pub. No.: WO2020/186443
PCT Pub. Date: Sep. 24, 2020

(65) Prior Publication Data
US 2022/0169259 A1    Jun. 2, 2022

(51) Int. Cl.
*G06F 7/00* (2006.01)
*B60W 40/10* (2012.01)
*B62D 15/02* (2006.01)

(52) U.S. Cl.
CPC ........... *B60W 40/10* (2013.01); *B62D 15/021* (2013.01); *B60W 2520/30* (2013.01); *B60W 2520/40* (2013.01)

(58) Field of Classification Search
CPC ............ B60W 40/10; B60W 2520/30; B60W 2520/40; B60W 10/08; B62D 15/021; B62D 9/002; B60K 2023/043; B60K 7/0007; G06F 7/00
USPC .......................................................... 701/36
See application file for complete search history.

(56) References Cited

U.S. PATENT DOCUMENTS

| | | | |
|---|---|---|---|
| 6,015,193 A * | 1/2000 | Vogel | B60T 8/321 303/140 |
| 2014/0162842 A1* | 6/2014 | Severinsson | F16H 48/36 477/35 |
| 2017/0328461 A1* | 11/2017 | Nasu | B60W 50/0098 |
| 2018/0208048 A1* | 7/2018 | Morio | F16H 48/36 |
| 2019/0338842 A1* | 11/2019 | Velazquez Alcantar | B60W 30/18172 |

FOREIGN PATENT DOCUMENTS

| | | |
|---|---|---|
| CN | 102167082 A | 8/2011 |
| CN | 103935265 A | 7/2014 |
| CN | 104494464 A | 4/2015 |
| CN | 105172785 A | 12/2015 |
| CN | 106864306 A | 6/2017 |
| JP | 4807030 B2 | 11/2011 |

* cited by examiner

*Primary Examiner* — Shardul D Patel

(57) ABSTRACT

A torque vectoring system for a hub motor drive system uses a motor control unit instead of a vehicle control unit to conduct torque vectoring calculation, so that a target motor torque can be obtained more reasonably and the real-time property is improved. In addition, as it is unnecessary to conduct calculation with the vehicle control unit, torque distribution and torque change can be evaluated on a testbed of the motor control unit prior to integrating the torque vectoring system into the vehicle.

10 Claims, 2 Drawing Sheets

TORQUE VECTOR DISTRIBUTION SYSTEM FOR HUB MOTOR DRIVING SYSTEM

CROSS-REFERENCE TO RELATED APPLICATIONS

This application is the U.S. National Phase of PCT Appln. No. PCT/CN2019/078628 filed Mar. 19, 2019, the entire disclosure of which is incorporated by reference herein.

TECHNICAL FIELD

The present disclosure relates to the field of vehicles, in particular to a torque vectoring system for a hub motor drive system of a vehicle.

BACKGROUND

At present, in a vehicle having a hub motor drive system, as there is no differential unit between the wheels, the virtual differential function between the wheels is typically implemented by using the torque vectoring function of the torque vectoring system for a hub motor drive system. Further, the torque vectoring function can also enable a Sport mode, and even enable part of the functions for Electronic Stability Control.

FIG. 1 depicts a structural block diagram of the torque vectoring system for a hub motor drive system according to the prior art. As shown in FIG. 1, the torque vectoring system for a hub motor drive system includes two motor control units (ICUs), two inverter/power converters (IPCs) and two wheel motors (WMs).

In the structure shown in FIG. 1, the two motor control units (ICUs) correspond to the two wheel motors (WMs) respectively, and the two motor control units (ICUs) are both in data communication with a vehicle control unit (VCU). After the vehicle control unit (VCU) calculates the target motor torque for each wheel motor (WM) based on the total torque request in accordance with the signal from the Vehicle Stability Program/Yaw Angle Sensing Unit (ESP/YAW), the two motor control units (ICUs) respond to the target motor torque and convert the target motor torque into power parameters to be applied to each wheel motor (WM). Each inverter/power converter (IPC) is connected to a motor control unit (ICU) and quantitatively inputs power to the wheel motor (WM) based on the power parameters obtained in the corresponding motor control unit (ICU), so that each wheel motor (WM) can achieve the target motor torque. It should be noted that in the prior art, the two wheel motors (WMs) share a cooling loop (as illustrated by a dashed line in the figure), and in the cooling loop, cooling medium is pumped to circulate in the cooling loop via a pump P which is controlled by the vehicle control unit (VCU).

In the process of implementing the torque vectoring according to the torque vectoring system for a hub motor drive system in the prior art, as the target motor torque is directly calculated in the vehicle control unit (VCU) without considering the current change in the two motor control units (ICUs) and the torque change in the wheel motors (WMs), it is difficult to evaluate the torque distribution and the torque change on the testbed of the motor control units (ICUs) prior to integrating the torque vectoring system into an actual vehicle. In addition, calculating the target motor torque directly in the vehicle control unit (VCU) may lead to a result where one of the wheel motors (WMs) is in the drive mode while the other wheel motor (WM) is in the power generation mode. Therefore, in this case, the protection function of the motor control unit (ICU) prevents the wheel motor (WM) from fully implementing the command for the target motor torque of the vehicle control unit (VCU). Further, in the current motor control unit (ICU), the slip ratio control on the hub motor drive system cannot be achieved, and the real-time property of calculating the target motor torque by means of the vehicle control unit (VCU) is also inadequate.

SUMMARY

It is desirable to provide a torque vectoring system for a hub motor drive system, which can overcome at least one of the defects in the above-mentioned prior art.

A torque vectoring system for a hub motor drive system includes: a drive module for measuring a plurality of specified parameters in the driving process of a vehicle; and a control module connected to the drive module and a vehicle control unit and a steering control unit of the vehicle, wherein the control module is used for receiving the plurality of specified parameters from the drive module, a total torque request from the vehicle control unit, and a steering angle from the steering control unit, and the control module calculates the target motor torque of each wheel motor in the hub motor drive system based on the total torque request and the steering angle in accordance with at least one of the plurality of specified parameters.

Preferably, the control module calculates the target wheel torque of each wheel of the vehicle based on the total torque request and the steering angle in accordance with at least one of the plurality of specified parameters and calculates the target motor torque of the corresponding wheel motor based on the target wheel torque.

The torque vectoring system may further includes: a power input unit for receiving direct current from a power supply module of the vehicle; and a power output unit electrically connected to the power input unit and in data communication with the control module, wherein the power output unit is used for receiving the direct current from the power input unit to convert the direct current into an alternating current, and the power output unit supplies the alternating current to each wheel motor based on the target motor torque such that each wheel motor can achieve the target motor torque.

The power output unit and each wheel motor of the vehicle may share a cooling loop, the cooling loop may be provided with a pump for driving a cooling medium to circulate in the cooling loop, and the pump may be controlled by the drive module.

The drive module may include a yaw angle sensing unit, a wheel speed sensing unit, a temperature sensing unit, a pump control unit and a CAN bus control unit.

The torque vectoring system may be capable of implementing a first type of operating mode, wherein the control module calculates the target motor torque and a torque distribution ratio of each wheel motor based on the total torque request and the steering angle in accordance with a vehicle speed.

The torque vectoring system may be capable of implementing a second type of operating mode, wherein the control module calculates the target motor torque and the torque distribution ratio of each wheel motor based on the total torque request and the steering angle in accordance with the vehicle speed, the yaw angle, and a lateral acceleration.

The torque vectoring system may be capable of implementing a third type of operating mode, wherein the control module calculates the target motor torque of each wheel motor in accordance with the vehicle speed and a wheel speed.

The priority of the third type of operating mode may be higher than the priority of the first type of operating mode and second type of operating mode.

In the third type of operating mode, the target motor torque may be reduced if the slip ratio of the wheel exceeds a predetermined threshold value.

The torque vectoring system uses a motor control unit instead of a vehicle control unit to conduct torque vectoring calculation, so that a target motor torque can be obtained more reasonably and the real-time property is improved. In addition, as it is unnecessary to conduct calculation with the vehicle control unit, torque distribution and torque change can be evaluated on a testbed of the motor control unit prior to integrating the torque vectoring system into the vehicle.

DETAILED DESCRIPTION

Specific implementations will be described in detail hereinafter with reference to the drawings.

Figure 1:
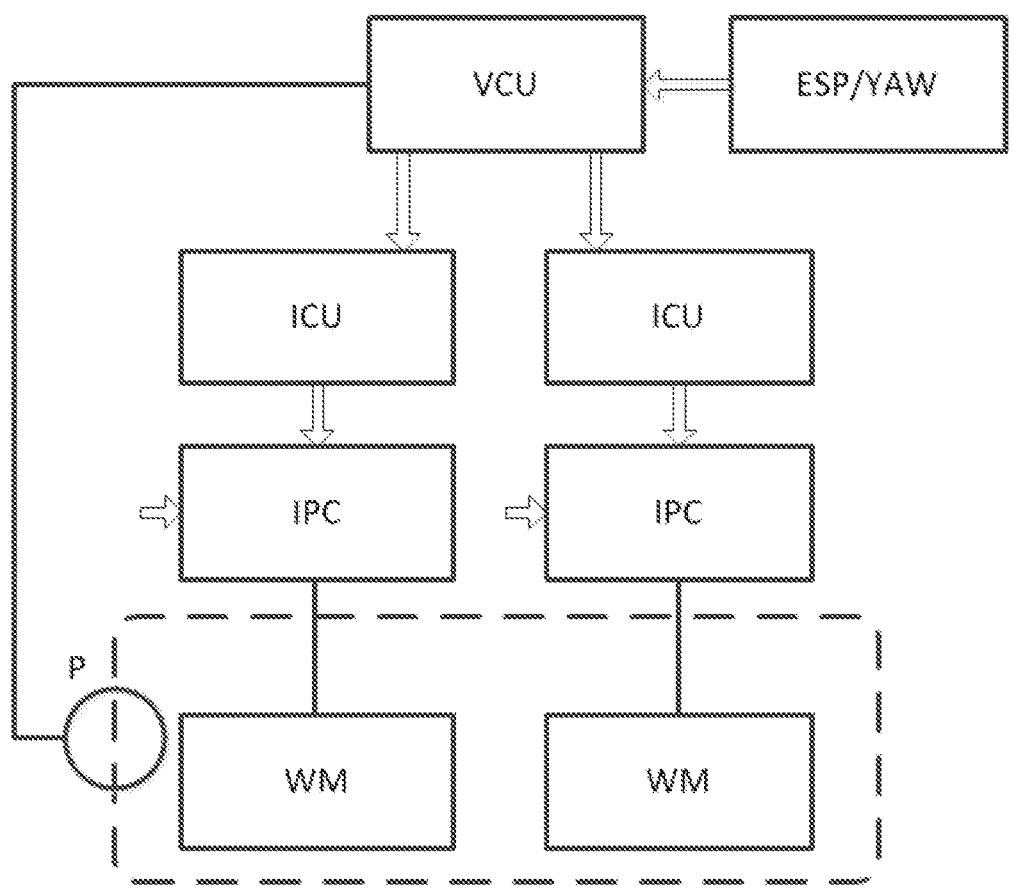
FIG. 1 depicts a structural block diagram of the torque vectoring system for a hub motor drive system according to the prior art.
Figure 2:
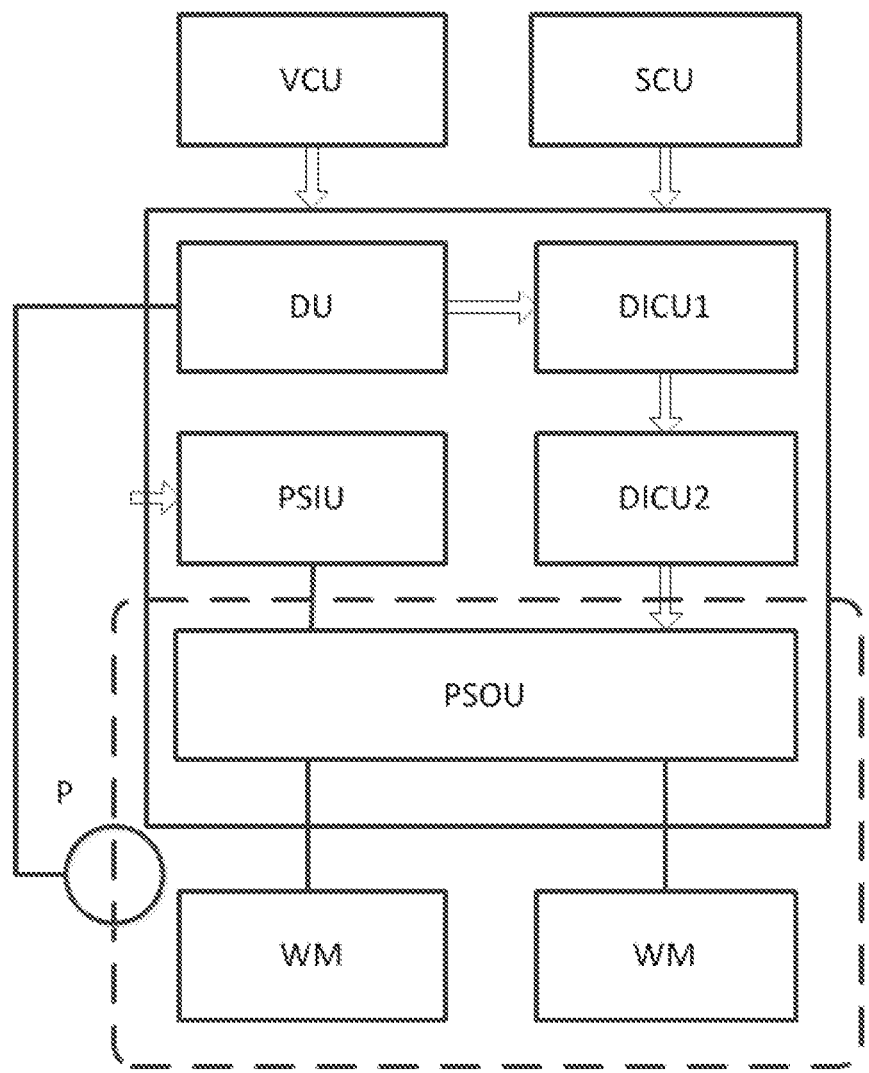
FIG. 2 depicts a structural block diagram of the torque vectoring system for a proposed hub motor drive system.

As shown in FIG. 2, the torque vectoring system for a hub motor drive system comprises the drive module (DU); the control module, including the first control unit (DICU1) and the second control unit (DICU2), the power input unit (PSIU), the power output unit (PSOU) and the wheel motor (WM).

In this implementation, the drive module (DU) is used for measuring a plurality of specified parameters in the driving process of a vehicle. Specifically, the drive module (DU) comprises a yaw angle sensing unit, a wheel speed sensing unit, a temperature sensing unit, a pump control unit and a CAN bus control unit.

The yaw angle sensing unit is, for example, a yaw angle sensor, which is used for measuring a yaw angle (a yaw rate) generated in the driving process of a vehicle.

The wheel speed sensing unit is, for example, a wheel speed sensor. Preferably, corresponding to each wheel, a wheel speed sensor is mounted. The wheel speed sensor is used for measuring a rotational speed of the corresponding wheel.

The temperature sensing unit is, for example, a temperature sensor, which is used for measuring the temperature of, for example, the power output unit (PSOU) and/or the wheel motor (WM).

The pump control unit is used for controlling the operating state of the pump P for pumping a cooling medium in the cooling loop.

The CAN bus control unit is used for controlling the communication in the CAN bus of the vehicle.

Based on the structure described above, the yaw angle (yaw rate), the wheel speed and the temperature measured by the drive module (DU) the current in the control module, and the torque in the wheel motor (WM) are used as predetermined parameters for calculating the target motor torque, and one or more of these parameters can affect the magnitude of the target motor torque.

In this implementation, the control module is actually a motor control unit, and the control module is in data communication with the drive module (DU) and the vehicle control unit (VCU) and the steering control unit (SCU) of the vehicle. The control module is used for receiving a plurality of specified parameters from the drive module (DU), the total torque request from the vehicle control unit (VCU) and the steering angle from the steering control unit (SCU), and the control module calculates the target motor torque of each wheel motor (WM) in the hub motor system based on the total torque request and the steering angle and in accordance with at least one of the plurality of specified parameters. The plurality of specified parameters herein are used to conduct necessary limitation and calibration on the calculated target motor torque to prevent mismatch between the calculated target motor torque and the actual operating state of each component of the hub motor drive system.

Specifically, the control module comprises the first control unit (DICU1) and the second control unit (DICU2). The first control unit (DICU1) is used for receiving the plurality of specified parameters, the total torque request and the steering angle, and calculates the target wheel torque of each wheel of the vehicle based on the total torque request and the steering angle and in accordance with at least one of the plurality of specified parameters. The target wheel torque comprises the magnitude and direction of the target output torque of the wheel.

The second control unit (DICU2) is in data communication with the first control unit (DICU1), and is used for receiving the target wheel torque from the first control unit (DICU1) and calculating the target motor torque of the corresponding wheel motor (WM) based on the target wheel torque. Further, the second control unit (DICU2) also converts the target motor torque into the power parameters needed by the wheel motor (WM). The target motor torque described herein is achieved by calculating the magnitude and direction of the torque needed by the wheel motor (WM) based on the target wheel torque of the wheel, and is further achieved by controlling the parameters (mainly by controlling the electric power input) of the wheel motor (WM).

Compared with the prior art, the real-time property can be greatly improved by transferring the calculation of the torque vectoring for the hub motor drive system from the vehicle control unit to the motor control unit (control module), given that the calculating process of the vehicle control unit (VCU) generally takes more than 10 ms, while the calculating process of the motor control unit takes as little as 1 ms. In addition, as the motor control unit can take conditions of parameters in the drive module into consideration when performing torque vectoring, there will be no mismatch between the calculated torque vectoring result and the actual operating state of each component in the hub motor drive system. Further, it also has other beneficial effects for facilitating system simulation and the like.

In this implementation, the power input unit (PSIU) is used for receiving the direct current from the power supply module of the vehicle. The power output unit (PSOU) is electrically connected to the power input unit (PSIU), and the power output unit (PSOU) is used for receiving the direct current from the power input unit (PSIU) to convert the direct current into the alternating current and supply the alternating current to the wheel motor (WM) quantitatively so as to enable the wheel motor (WM) to achieve the target motor torque.

In this implementation, in order to control temperatures of the power output unit (PSOU) and the wheel motor (WM), the power output unit (PSOU) and the wheel motor (WM)

share the same cooling loop. The cooling loop is provided with the pump P for driving the cooling medium to circulate in the cooling loop, and the pump P is controlled by the pump control unit in the drive module (DU).

The structure of the torque vectoring system for a hub motor drive system are described in detail as above, and the operating method of the torque vectoring system for a hub motor drive system will be described hereinafter.

The torque vectoring system for a hub motor drive system conducts torque vectoring calculation via the torque distribution system for a hub motor drive system itself instead of via the vehicle control unit (VCU), and only needs to obtain two external input signals, i.e., the total torque request from the vehicle control unit (VCU) and the steering angle from the steering control unit (SCU), by using a vehicular communication network. By means of the external input signals (the aforesaid total torque request and the steering angle) and internally obtained specified parameters, the torque vectoring system for a hub motor drive system can implement the first type of operating mode, the second type of operating mode and the third type of operating mode as described below.

In the first type of operating mode, the control module calculates the target motor torque and the torque distribution ratio of each wheel motor (WM) based on the total torque request and the steering angle in accordance with the vehicle speed. For example, under the condition that the total torque request is specified, a meter reading can be conducted to obtain the target motor torque and the torque distribution ratio by means of the two parameters, i.e., the steering angle and the vehicle speed. The first type of operating mode preferably includes a virtual differential mode and an in-operation mode. Further, the vehicle speed is determined preferably according to the wheel speed obtained by the wheel speed sensors of the four wheels when the vehicle speed is calculated.

In the second type of operating mode, the control module calculates the target motor torque and the torque distribution ratio of each wheel motor (WM) based on the total torque request and the steering angle in accordance with the vehicle speed, the yaw angle and the lateral acceleration. The second type of operating mode preferably comprises a vehicle stability control mode.

In the third type of operating mode, the control module calculates the target motor torque of each wheel motor (WM) simply according to the vehicle speed and the wheel speed without the need for any external input signal. The third type of operating mode preferably comprises a slip ratio control mode. For the sake of driving safety of the vehicle, the third type of operating mode has the highest priority. The highest priority herein means that verification by the third type of operating mode needs to be performed regardless of whether the first type of operating mode or the second type of operating mode is implemented, that is, once the implementation condition of the third type of operating mode is met, results of the target motor torque obtained in the first type of operating mode and the second type of operating mode will be affected extremely.

Further, in the third type of operating mode, if the slip ratio of the wheel exceeds a predetermined threshold value, the target motor torque will be limited. In other words, if the wheel motor (WM) is in the drive mode, the positive torque of the wheel motor (WM) is reduced to be in a safe range; and if the wheel motor (WM) is in the power generation mode, the negative torque of the wheel motor (WM) is reduced to be in a safe range.

Although specific technical schemes have been described in detail, it should still be added that:

I. All the sensing units in the drive module (DU) and the control unit are not necessarily integrated together on the hardware. Instead, it is only required to integrate functions of the sensing units and control unit via the software.

II. When the target motor torque is calculated according to the plurality of predetermined parameters, the control module limits the target motor torque in a timely manner during its own calculation cycle (usually within 1 ms) when excessive temperature, overvoltage or overcurrent occurs to any part of the wheel motor or an electronic control system. When the vehicle control unit (VCU) in the prior art is adopted for calculating the target motor torque, the calculation cycle thereof is usually longer than 10 ms, which is so long that the wheel motor or the electronic control system cannot be protected in a timely manner. In addition, it is difficult for the vehicle control unit (VCU) to obtain related information of all parts of the control module, and consequently, protection measures cannot be implemented effectively.

Further, when excessive temperature, overvoltage or overcurrent occurs to any part of the wheel motor or the electronic control system, flow of the cooling medium can be further controlled via the pump control unit and the like. Generally, the flow rate of the cooling medium is controlled to guarantee that both the wheel motor and the electronic control system operate within an allowable temperature range. In addition, when it is detected that the temperature of parts of the electronic control system exceeds a certain temperature, controls over power reduction and current limitation can also be conducted.

III. The third type of operating mode described above is merely optional rather than essential, but it is of the highest priority once implemented.

IV. The torque vectoring system for a hub motor drive system further has the following beneficial effects:

the torque vectoring system for a hub motor drive system (with a cooling loop) and the dual wheel motor (WM) can be packaged into an individual product package;

in the development process, the torque vectoring system for a hub motor drive system can be developed independently of the development of the vehicle control unit (VCU);

when a user is using the torque vectoring system for a hub motor drive system, it is unnecessary to disclose the modular architecture of the torque vectoring system, and therefore, the torque vectoring system for a hub motor drive system is formed as a black box module independent of the vehicle control unit (VCU);

under the condition that the vehicle control unit (VCU) does not implement the vehicle torque vectoring calculation, the situation that the vehicle control unit (VCU) is recompiled due to a simple change to the algorithm for vehicle torque vectoring is avoided;

in the simulation stage of the torque vectoring system for a hub motor drive system, it is unnecessary to disclose the interior architecture of the vehicle control unit (VCU);

the torque vectoring system for a hub motor drive system can be integrated into the vehicle simply by being in data communication with the vehicle control unit (VCU) and being in communication with signal cables of a pedal, and the integration mode is simple and feasible;

the torque vectoring system for a hub motor drive system can conduct vehicle torque vectoring calculation only based on the yaw angle/the yaw rate signal thereof without the vehicle stability control signal;

in the technical scheme, it is unnecessary for the vehicle control unit (VCU) to take the recoding of the yaw angle sensor signal into consideration, so that the efforts related to the calibration of the vehicle control unit (VCU) are reduced; and a situation that the power supply module and the like are damaged as a result of unreasonable torque vector calculated by the vehicle control unit (VCU) in the prior art can be avoided.

LIST OF REFERENCE NUMERALS

VCU Vehicle Control Unit;
ESP/YAW Vehicle Stability Program/Yaw Angle Sensing Unit;
ICU Motor Control Unit;
IPC Inverter/Power Converter;
WDM Wheel Motor;
P Pump;
SCU Steering Control Unit;
DU Drive Module;
DICU1 First Control Unit;
DICU2 Second Control Unit;
PSIU Power Input Unit;
PSOU Power Output Unit

The invention claimed is:

1. A torque vectoring system for a hub motor drive system, comprising:
   a drive module configured to measure a plurality of specified parameters in the driving process of a vehicle; and
   a control module connected to the drive module and to a vehicle control unit and to a steering control unit of the vehicle, wherein the control module is configured to receive the plurality of specified parameters from the drive module, a total torque request from the vehicle control unit, and a steering angle from the steering control unit, and wherein the control module calculates a target motor torque of each wheel motor in the hub motor drive system based on the total torque request and the steering angle in accordance with at least one of the plurality of specified parameters.

2. The torque vectoring system for a hub motor drive system of claim 1, wherein the control module further calculates a target motor torque of the corresponding wheel motor based on the target wheel torque.

3. The torque vectoring system for a hub motor drive system of claim 1, further comprising:
   a power input unit configured to receive a direct current from a power supply module of the vehicle; and
   a power output unit electrically connected to the power input unit and in data communication with the control module, wherein the power output unit is configured to receive the direct current from the power input unit and to convert the direct current into an alternating current, wherein the power output unit supplies the alternating current to each wheel motor based on the target motor torque such that each wheel motor can achieve the target motor torque.

4. The torque vectoring system for a hub motor drive system of claim 3, wherein the power output unit and each wheel motor of the vehicle share a cooling loop, the cooling loop is provided with a pump for driving a cooling medium to circulate in the cooling loop, and the pump is controlled by the drive module.

5. The torque vectoring system for a hub motor drive system of claim 1, wherein the drive module comprises a yaw angle sensing unit, a wheel speed sensing unit, a temperature sensing unit, a pump control unit, and a CAN bus control unit.

6. The torque vectoring system for a hub motor drive system of claim 1, wherein the torque vectoring system is capable of implementing a first type of operating mode, wherein the control module calculates the target motor torque and a torque distribution ratio of each wheel motor based on the total torque request and the steering angle in accordance with a vehicle speed.

7. The torque vectoring system for a hub motor drive system of claim 6, wherein the torque vectoring system is capable of implementing a second type of operating mode, wherein the control module calculates the target motor torque and the torque distribution ratio of each wheel motor based on the total torque request and the steering angle in accordance with the vehicle speed, the yaw angle, and a lateral acceleration.

8. The torque vectoring system for a hub motor drive system of claim 7, wherein the torque vectoring system is capable of implementing a third type of operating mode, wherein the control module calculates the target motor torque of each wheel motor in accordance with the vehicle speed and a wheel speed.

9. The torque vectoring system for a hub motor drive system of claim 8, wherein the priority of the third type of operating mode is higher than the priority of the first type of operating mode and second type of operating mode.

10. The torque vectoring system for a hub motor drive system of claim 8, wherein in the third type of operating mode, the target motor torque is reduced if a slip ratio of the wheel exceeds a predetermined threshold value.

* * * * *